United States Patent
Ogawa et al.

(10) Patent No.: US 7,346,599 B2
(45) Date of Patent: Mar. 18, 2008

(54) STORAGE SYSTEM AND METHOD OF MANAGING DATA STORED IN A STORAGE SYSTEM

(75) Inventors: Junji Ogawa, Tokyo (JP); Yusuke Nonaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 11/007,775

(22) Filed: Dec. 7, 2004

(65) Prior Publication Data
US 2006/0085413 A1    Apr. 20, 2006

(30) Foreign Application Priority Data
Oct. 20, 2004    (JP)    ............................. 2004-305366

(51) Int. Cl.
*G06F 7/00*    (2006.01)
(52) U.S. Cl. ............................................. 707/1; 707/10
(58) Field of Classification Search ............... 707/1–10, 707/100, 200, 201
See application file for complete search history.

(56) References Cited

U.S. PATENT DOCUMENTS 6,185,661 B1    2/2001    Ofek et al.

2002/0165724 A1*    11/2002    Blankesteijn ................... 705/1
2004/0172557 A1*    9/2004    Nakae et al. .................. 713/201
2005/0018618 A1*    1/2005    Mualem et al. ............... 370/252

FOREIGN PATENT DOCUMENTS

JP        07-013705        1/1995

* cited by examiner

*Primary Examiner*—Wilson Lee
(74) *Attorney, Agent, or Firm*—Townsend and Townsend and Crew LLP

(57) ABSTRACT

The fact that data stored in a storage system is not updated for a given period is proven to a third party. A method of managing data that is given an update prohibitive attribute includes a step of storing, in a management server, information on an end time of the update prohibitive attribute which is received from a storage system, a step of receiving, from the storage system, a request for permission to change the update prohibitive attribute given to the data and obtaining, from the management server, the end time of the update prohibitive attribute given to the data on which the request is made, a step of judging whether or not the end time of the update prohibitive attribute has passed, and a step of sending, when it is judged that the end time of the update prohibitive attribute given to the data on which the request is made has passed, permission to change the update prohibitive attribute given to the data on which the request is made to the storage system.

12 Claims, 9 Drawing Sheets

STORAGE SYSTEM AND METHOD OF MANAGING DATA STORED IN A STORAGE SYSTEM

CLAIM OF PRIORITY

The present application claims priority from Japanese application P2004-305366 filed on Oct. 20, 2004, the content of which is hereby incorporated by reference into this application.

BACKGROUND

This invention relates to a storage system, in particular, management of data whose preservation period is determined.

Among data stored in a storage system, there is data whose preservation for a certain period of time is obligated. Such data is, for instance, audit target data in a specific category of business.

There is a method with which a WORM (Write Once Read Many) attribute, in other words, an update prohibition attribute is given to such data at the time of storage, thereby proving that the data determined once is not erased or tampered and ensuring the correctness of the data.

In general, the WORM is property possessed by write-once optical disks and the like (CD-Rs, for instance). Therefore, by storing data on such write-once media, the WORM attribute is realized with ease.

Aside from this, from the viewpoint of performance and the like, a method is also proposed with which the WORM is realized in a storage system comprising a magnetic disk.

In JP 07-13705 A, a method is disclosed with which overwriting of data on a disk is prevented by providing a writing prohibition flag or the like on the disk.

SUMMARY

When a WORM attribute is virtually given to a medium, such as a magnetic disk, that does not originally possess a WORM attribute, it is possible to set a term (WORM guarantee term) for the WORM attribute. In this case, the WORM attribute can be reset when the set term expires.

In the case of data whose preservation for a certain period of time is obligated, for instance, once the period of time ends, an area used to store the data can be used for another purpose. Therefore, it becomes possible to use the storage area with efficiency.

However, there are incidences where the WORM attribute of data whose WORM guarantee period has not expired yet is removed by a wrong manipulation made by a storage system administrator intentionally or unintentionally. One example is an unauthorized removal of the WORM attribute by an administrator. In another example, an administrator of a storage system advances the clock of the storage system forward so that the system deems a WORM guarantee period as expired earlier than when it actually is, making data on which updating is prohibited available for an update.

Whether to remove the WORM attribute from data stored in a storage system or not is judged by the storage system through consultation with a built-in clock or the like. It is therefore difficult to prove, to a third party (auditing organization, for example), that the WORM attribute is removed under authorization and that no data is updated before expiration of its WORM guarantee period.

This invention provides a method of managing data that is given an update prohibitive attribute and stored in a storage system included in a computer system, which is comprised of a management server to manage the update prohibitive attribute and a network to couple the storage system with the server, and the method is comprised of a first step of receiving information on an end time of the update prohibitive attribute from the storage system and storing the received information in the management server, a second step of receiving, from the storage system, a request for permission to change the update prohibitive attribute given to the data and obtaining, from the management server, the end time of the update prohibitive attribute given to the data on which the request is made, a third step of judging whether the end time of the update prohibitive attribute has passed or not, and a fourth step of sending, when it is judged that the end time of the update prohibitive attribute given to the data on which the request is made has passed, permission to change the update prohibitive attribute given to the data on which the request is made to the storage system.

This invention makes it possible to prove to a third party that a WORM attribute is removed under authorization. In other words, this invention makes it possible to prove to a third party that data is not updated before expiration of its WORM guarantee period.

DETAILED DESCRIPTION OF THE PREFERRED EMBODIMENT

Figure 1:
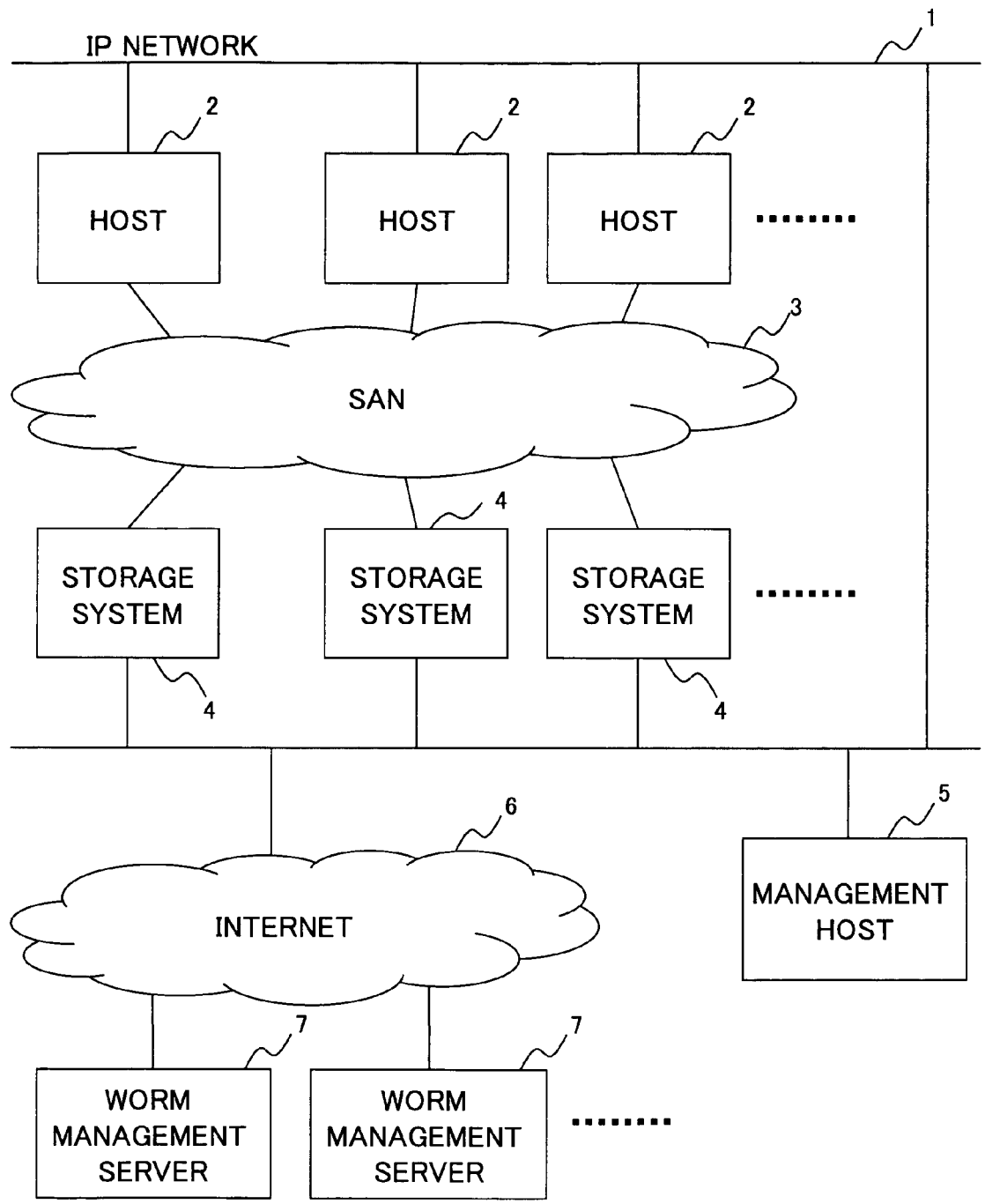
FIG. 1 is a block diagram showing the configuration of a computer system according to an embodiment of this invention.

FIG. 1 is a block diagram showing a configuration of a computer system according to the present invention.

Each host 2 is a computer that is connected to each storage system 4 through a storage area network (SAN) 3. The host 2 accesses data stored in the storage system 4 using a block I/O interface or a file I/O interface.

In addition, the host 2 is connected to the storage system 4 through an IP network 1. The host 2 may access the data stored in the storage system 4 through the IP network 1.

In the storage system 4, data is stored. To the data stored in the storage system 4, a WORM (Write Once Read Many)

attribute, or an update prohibition attribute may be given. Further, a term (WORM guarantee term) can be set in which the WORM attribute should be maintained. When the WORM guarantee term is set for data, the host 2 or the like can not update the data before the WORM guarantee term expires.

Details of the configuration of the storage system 4 will be given later referring to FIGS. 2 and 3.

The management host 5 is a computer comprising an input/output device (not shown). The management host 5 is connected to the host 2 and the storage system 4 through the IP network 1 and manages those devices.

The IP network 1 is connected to an internet 6, which is connected to a WORM management server 7.

The WORM management server 7 is a computer that manages the WORM attribute of data stored in the storage system 4. The WORM management server 7 is managed by, for example, a third party which takes on consignment the business of managing the WORM attribute and proving the authenticity of data (hereinafter referred to as WORM management organization).

Specifically, the WORM management server 7 judges, upon removal of a WORM attribute from data stored in the storage system 4, whether the removal is valid or not. When the removal is judged to be valid, the WORM management server 7 issues permission to remove the WORM attribute to the storage system 4. The storage system 4 can prove the validity of the removal of the WORM attribute to another third party (for example, an auditing organization) by presenting the issued permission.

Details of the configuration of the WORM management server 7 will be given later referring to FIGS. 4 to 6.

Figure 2:
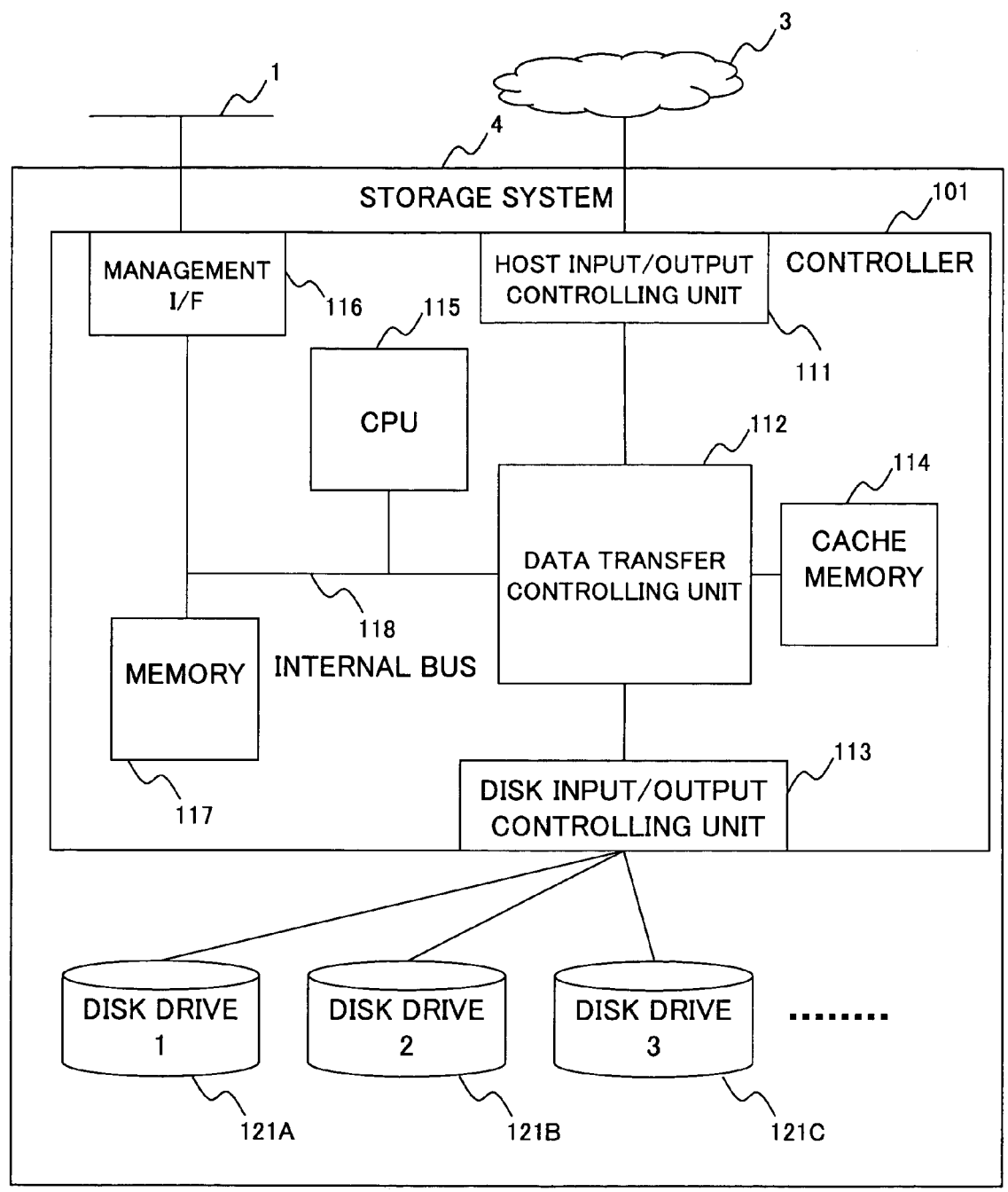
FIG. 2 is a block diagram showing the configuration of a storage system according to the embodiment of this invention.

FIG. 2 is a block diagram showing a configuration of the storage system 4 according to the embodiment of this invention.

The storage system 4 comprises disk drive 121 and a controller 101.

In the disk drive 121, data is stored.

The disk drives 121 constitute disk arrays. Although FIG. 2 shows as an example three disk drives 121A to 121C, the storage system 4 can have as many disk drives 121 as necessary.

The controller 101 manages the data stored in the disk drive 121. The controller 101 comprises a host input/output control unit 111, a data transfer control unit 112, a cache memory 114, a disk input/output control unit 113, a CPU 115, a management I/F 116, a memory 117, and an internal bus 118.

The host input/output control unit 111 is an interface that communicates with the host 2 through the SAN 3. For instance, the host input/output control unit 111 exchanges data and a control signal with the host 2 and the like using a fibre-channel protocol or an iSCSI protocol. In addition, the host input/output control unit 111 performs conversion of protocols used outside and inside the storage system 4.

The cache memory 114 is, for instance, a semiconductor memory and temporarily stores data to be exchanged between the host input/output control unit 111 and the disk input/output control unit 113.

The data transfer control unit 112 controls data transfer between the CPU 115, the host input/output control unit 111, the disk input/output control unit 113, and the cache memory 114. In addition, for data guarantee, the data transfer control unit 112 adds a guarantee code to data to be transferred.

The disk input/output control unit 113 is an interface with respect to the disk drive 121. For instance, the disk input/output control unit 113 exchanges data and a control signal with the disk drive 121 and the like using an interface of ATA, SAS (Serial Attached SCSI), fibre channel, or the like. In addition, the disk input/output control unit 113 performs conversion of protocols used outside and inside the controller 101.

In other words, the data transfer control unit 112 transfers data to be read/written from/into the disk drive 121 by the host 2 between the host input/output control unit 111 and the disk input/output control unit 113. In addition, the data transfer control unit 112 transfers the data to the cache memory 114.

The management interface (I/F) 116 is an interface with respect to the IP network 1. The management I/F 116 exchanges data and a control signal with the management host 5 and the like using TCP/IP protocols.

In the memory 117, a control program is stored. The CPU 115 reads the control program from the memory 117 and executes it, thereby realizing various kinds of processing. In addition, in the memory 117, management information to be used at the time of execution of the control program is stored.

The internal bus 118 connects the units, such as the CPU 115, in the controller 101 to each other in a communicable manner.

Figure 3:
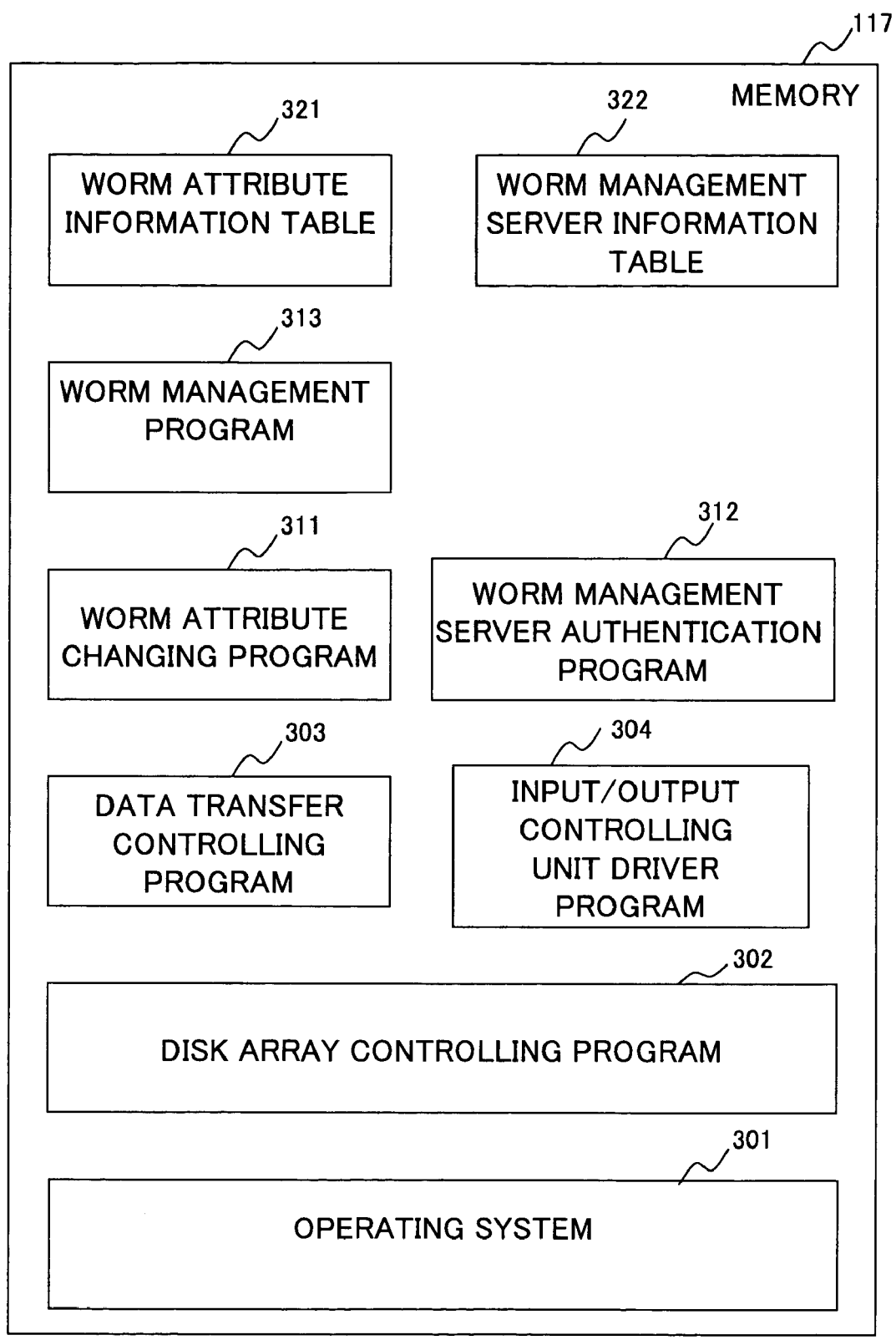
FIG. 3 is an explanatory diagram of a memory of the storage system according to the embodiment of this invention.

FIG. 3 is an explanatory diagram of the memory 117 of the storage system 4 according to the embodiment of this invention.

In the memory 117, the control program and the management information table are stored. Various kinds of processing are realized through execution of the control program by the CPU 125. More specifically, in the memory 117, an operating system 301, a disk array control program 302, a data transfer control program 303, an input/output control unit driver program 304, a WORM attribute changing program 311, a WORM management server authentication program 312, a WORM attribute information table 321, and a WORM management server information table 322 are stored.

The operating system 301 is a basic program that causes each control program to operate.

The disk array control program 302 controls input/output of data into/from the disk drive 121 according to a data input/output request from the host 2 or the like. More specifically, the disk array control program 302 performs control of the disk array through RAID conversion, logical-physical address conversion, or the like.

The data transfer control program 303 performs data transfer by controlling the data transfer control unit 112.

The input/output control unit driver program 304 controls the host input/output control unit 111 and the disk input/output control unit 113.

The WORM attribute changing program 311 gives a WORM attribute to data stored in the disk drives 121, or removes the WORM attribute given to the data.

The WORM management server authentication program 312 judges the authenticity of permission to remove a WORM attribute which is received from the WORM management server 7.

The WORM management program 313 manages the WORM attribute of data stored in the disk drives 121. Specifically, the WORM management program 313 consults the WORM attribute information table 321 and the WORM management server information table 322 to communicate with the WORM management server 7 and control giving and removal of a WORM attribute. The WORM attribute changing program 311 and the WORM management server authentication program 312 operate as subroutines of the WORM management program 313.

The operation of the WORM management program 313 will later be described in detail with reference to FIGS. 7 and 8.

The WORM management table 321 stores information on a storage area (WORM setting area) of the disk drives 121 where data that is given a WORM attribute is stored and information on a WORM guarantee period.

Figure 9:
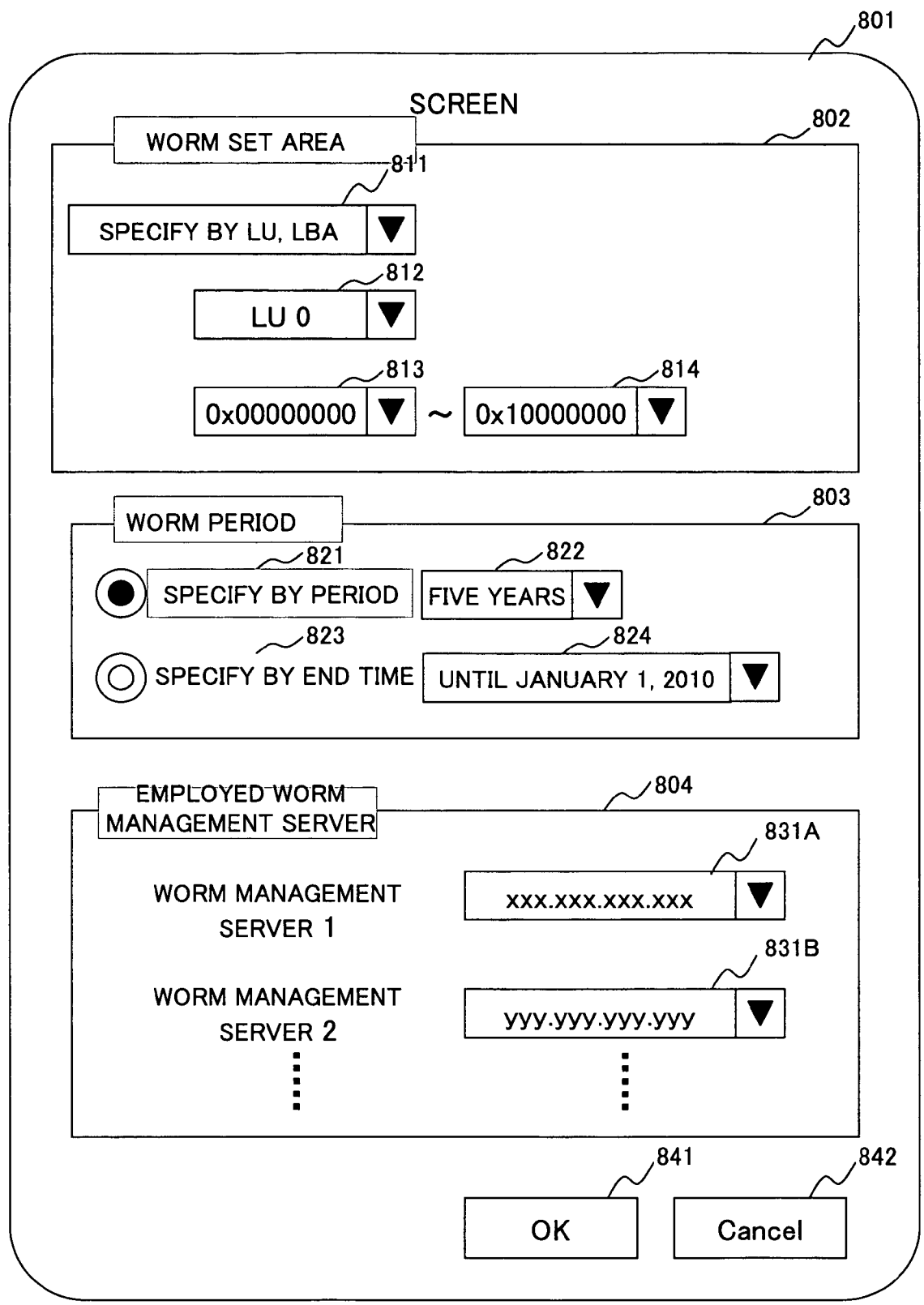
FIG. 9 is an explanatory diagram of a management screen according to the embodiment of this invention.

The WORM management server information table 322 stores the IP address of the WORM management server 7. A manufacturer of the storage system 4 can register the IP address of one or more reliable WORM management servers 7, 7, 7 . . . in the WORM management server information table 322. An administrator of the storage system 4 is not allowed to update the WORM management server information table 322, but can choose from which one out of the WORM management servers 7, 7, 7 . . . registered in the WORM management server information table 322 he or she is going to request permission to remove a WORM attribute as shown in FIG. 9.

Figure 4:
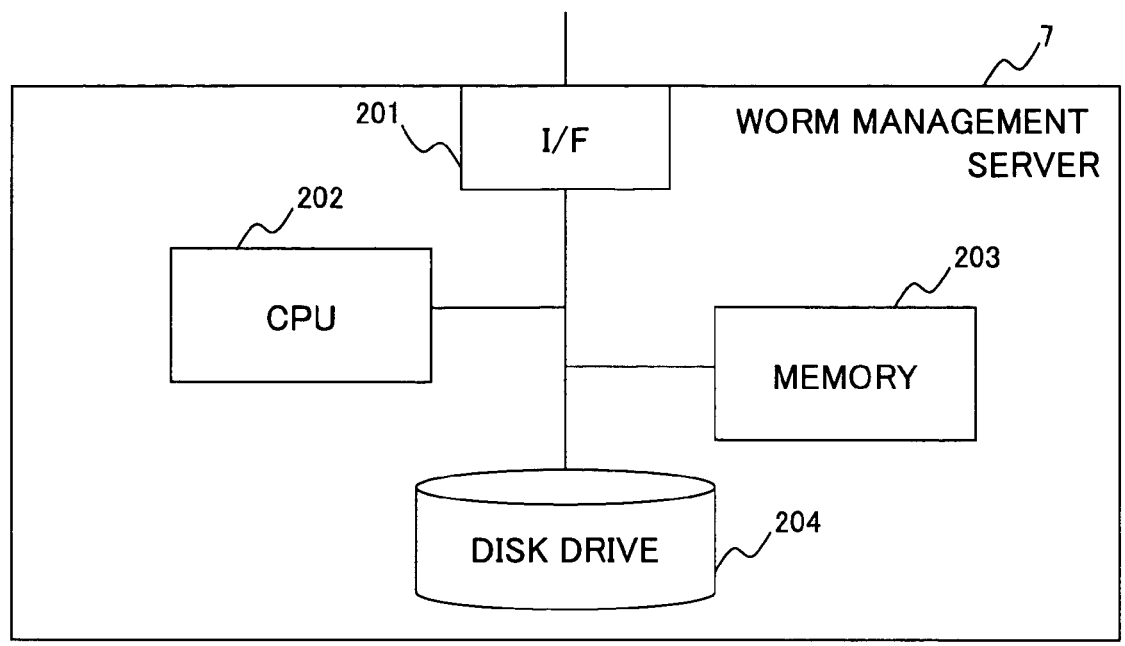
FIG. 4 is a block diagram showing the configuration of a WORM management server according to the embodiment of this invention.

FIG. 4 is a block diagram of the WORM management server 7 according to the embodiment of this invention.

The WORM management server 7 is a computer composed of an interface (I/F) 201, a CPU 202, a memory 203, and a disk drive 204.

The I/F 201 communicates with the storage system 4 and others via the internet 6 and the IP network 1.

The CPU 202 is a processor that executes programs stored in the memory 203.

The memory 203 stores programs executed by the CPU 202 and information consulted by these programs. The programs and the like stored in the memory 203 will later be described in detail with reference to FIGS. 5 and 6.

The disk drive 204 stores data for use by the WORM management server 7. For instance, the programs executed by the CPU 202 may be stored in the disk drive 204 and, when needed, loaded onto the memory 203 to be executed by the CPU 202.

Figure 5:
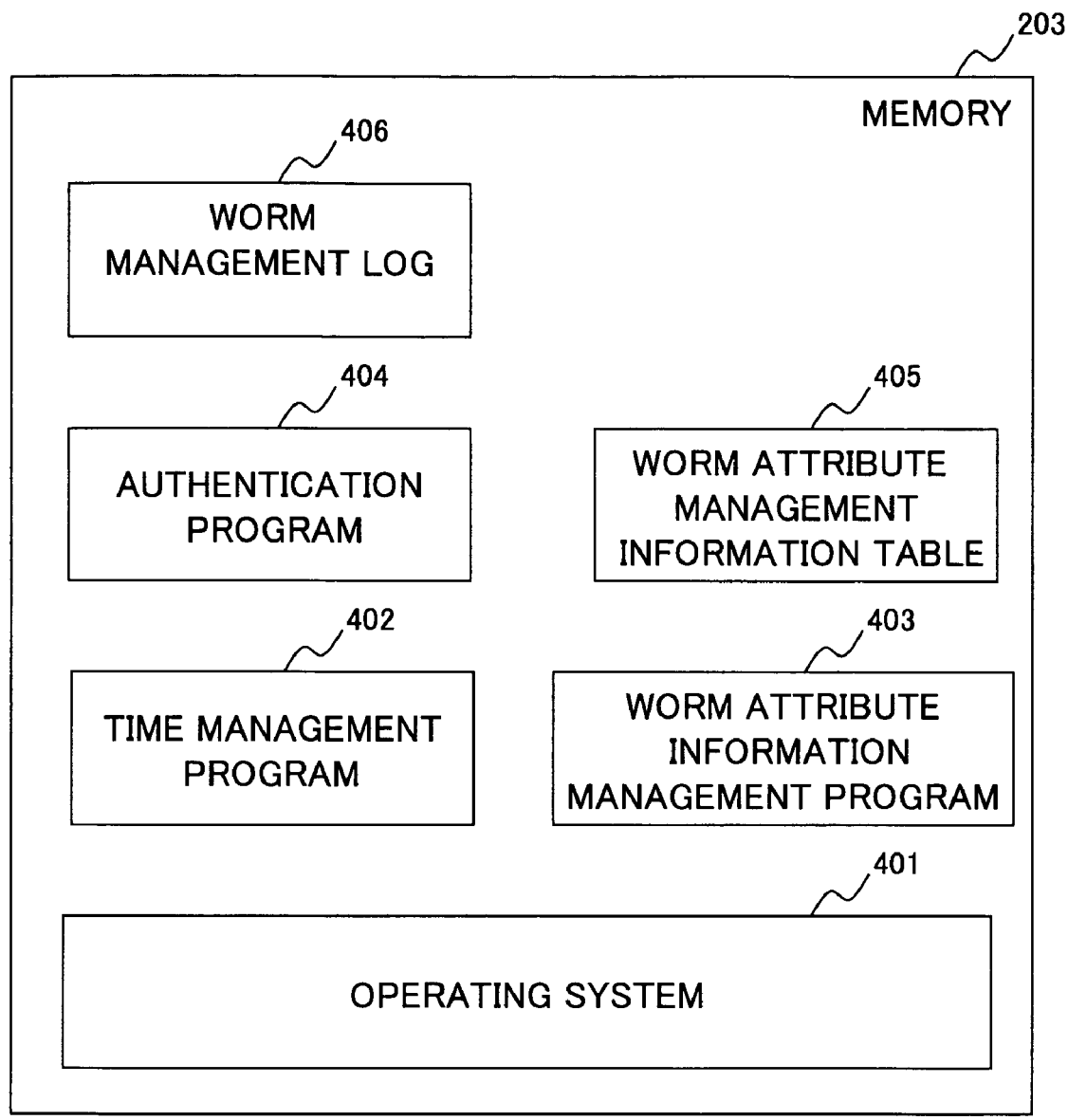
FIG. 5 is an explanatory diagram of a memory of the WORM management server according to the embodiment of this invention.

FIG. 5 is an explanatory diagram of the memory 203 of the WORM management server 7 according to the embodiment of this invention.

In the memory 203, the control program and the management information are stored. Various kinds of processing are realized through execution of those programs by the CPU 202. More specifically, in the memory 203, an operating system 401, a time management program 402, a WORM attribute information management program 403, an authentication program 404, a WORM attribute management information table 405, and a WORM management log 406 are stored.

The operating system 401 is a basic program that causes each control program to operate.

The time management program 402 processes time information obtained by consulting a clock (omitted from the drawing). For instance, the time management program 402 judges whether the current time obtained from the clock is before or past a given time point.

The WORM attribute information management program 403 manages information stored in the WORM attribute management information table 405. The WORM attribute information management program 403 also issues information notifying permission to change (remove) a WORM attribute and sends the information to the storage system 4. Hereinafter, the information notifying permission to change (remove) a WORM attribute will be referred to as "WORM attribute change permit". Removal of a WORM attribute is included in change of a WORM attribute. In other words, obtaining a WORM attribute change permit means that the WORM attribute can be removed.

The WORM attribute change permit contains, for example, the name of an owner (individual or company) of data on which a WORM attribute change is permitted by this permit, the type of the data (e.g., an e-mail archive), the date and time the data is created or updated, or the like.

The authentication program 404 adds authentication information of the WORM management server 7 to the WORM attribute change permit sent from the WORM attribute information management program 403.

For instance, the authentication program 404 adds, to the WORM attribute change permit, data obtained by encoding a specific data string with the use of a given private key. Receiving the encoded data, the storage system 4 uses a public key that corresponds to the private key to decode the received data string. When the data string is decoded successfully, the WORM management server 7 is authenticated. In other words, the WORM attribute change permit is judged as one sent from the WORM management server 7.

Alternatively, the authentication program 404 may use a private key to encode the WORM attribute change permit itself. In this case, the encoded WORM attribute change permit is sent from the WORM management server 7 to the storage system 4.

In either case, authentication information is sent from the WORM management server 7 along with the WORM attribute change permit and received by the storage system 4 along with the WORM attribute change permit.

The WORM attribute management information table 405 contains information for management of a WORM attribute given to data that is stored in the storage system 4. Details of the WORM attribute management information table 405 will be described later with reference to FIG. 6.

The WORM management log 406 is a log of WORM attribute change permits issued from the WORM attribute information management program 403. In other words, when the WORM attribute information management program 403 issues a WORM attribute change permit, the WORM attribute change permit issued is sent to the storage system 4 and at the same time stored in the WORM management log 406.

The administrator of the storage system 4 presents, to a third party (auditing organization, for example), a past WORM attribute change permit stored in the WORM management log 406, thereby proving that the WORM attribute of data stored in the storage system 4 has been removed under authorization. This proves the validity of the data in the storage system 4.

Once stored in the WORM management log 406, information is usually not deleted since it may later need to be shown to a third party. Information is therefore accumulated in the WORM management log 406. In the case where the capacity of the memory 203 is not enough, a part of the WORM management log 406 may be stored in the disk drive 204. Alternatively, the entirety of the WORM management log 406 may be stored in the disk drive 204 from the start.

Figure 6:
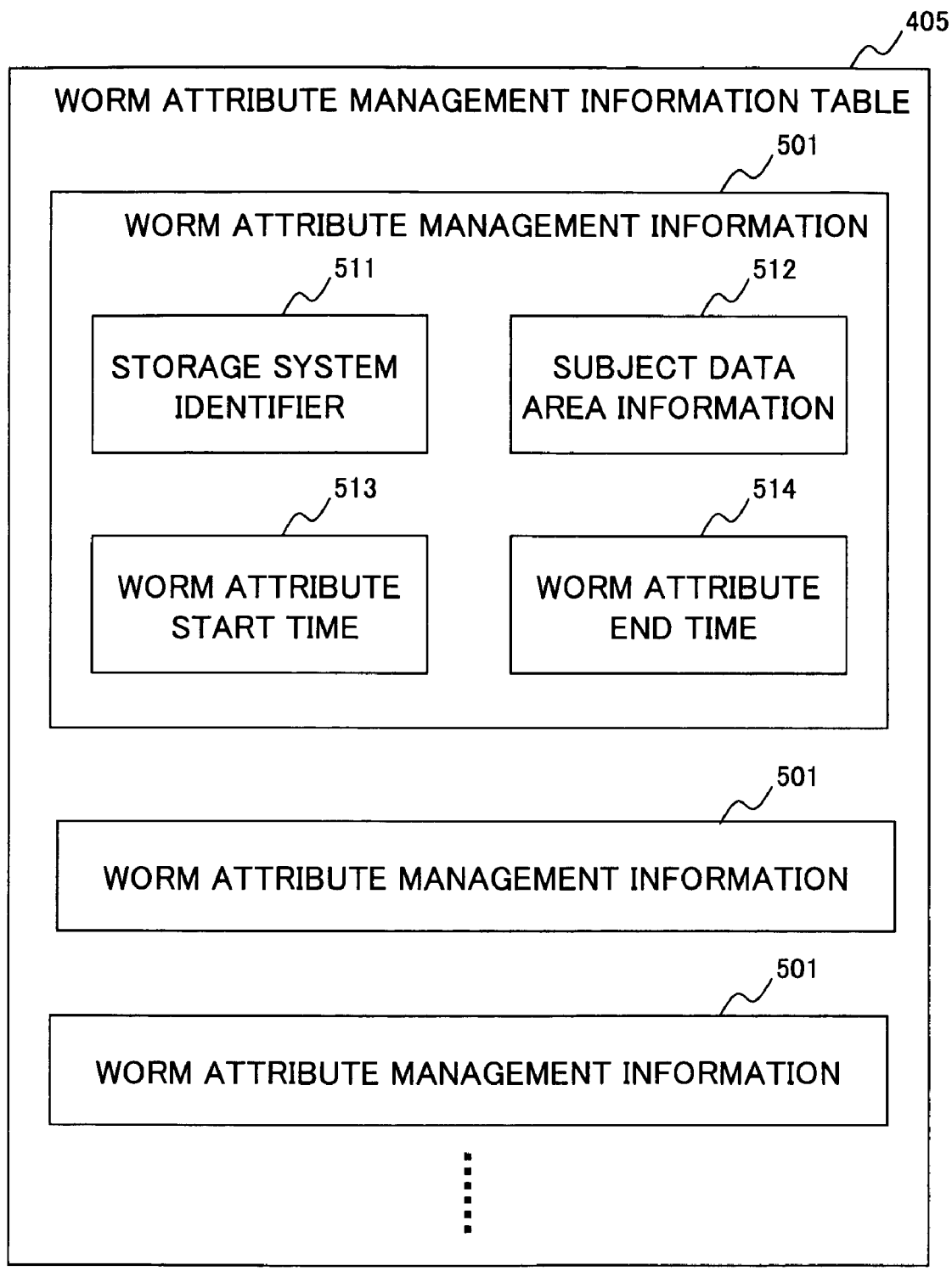
FIG. 6 is an explanatory diagram of a WORM attribute management information table according to the embodiment of this invention.

FIG. 6 is an explanatory diagram of the WORM attribute management information table 405 according to the embodiment of this invention.

The WORM attribute management information table 405 stores WORM attribute management information 501. The WORM attribute management information 501 includes a storage system identifier 511, subject data area information 512, a WORM attribute rendering start time 513, and a WORM attribute rendering end time 514.

The storage system identifier 511 is an identifier of the storage system 4 which stores data given a WORM attribute. The WORM management server 7 has to manage, in some cases, the WORM attribute of data of more than one storage system 4 and therefore uses the storage system identifier 511 to recognize which storage system 4 the WORM attribute management information 501 describes.

The subject data area information 512 is information indicating an area in the storage system 4 that stores data given a WORM attribute. For instance, in the case where a WORM attribute is given to the entirety of one logical volume (LU) in the storage system 4, the identifier of this logical volume constitutes the subject data area information 512. On the other hand, in the case where a WORM attribute is given to a part of the LU, the identifier of this part (e.g., an address corresponding to this part) constitutes the subject data area information 512.

The WORM attribute start time 513 is the start point of a time period during which a WORM attribute is given.

The WORM attribute end time 514 is the end point of a time period during which a WORM attribute is given. In other words, the WORM attribute end time 514 is the time limit of a WORM guarantee period.

Hereinafter, a period from the WORM attribute start time 513 to the WORM attribute end time 514 is referred to as WORM period. During a WORM period, updating is prohibited for data in an area of the storage system 4 that is indicated by the subject data area information 512 indicated by the storage system identifier 511.

In the case where the storage system 4 managed by the WORM management server 7 has plural areas to which a WORM attribute is given, the WORM attribute management information 501 is created for each of the areas and stored in the WORM attribute management information table 405.

Figure 7:
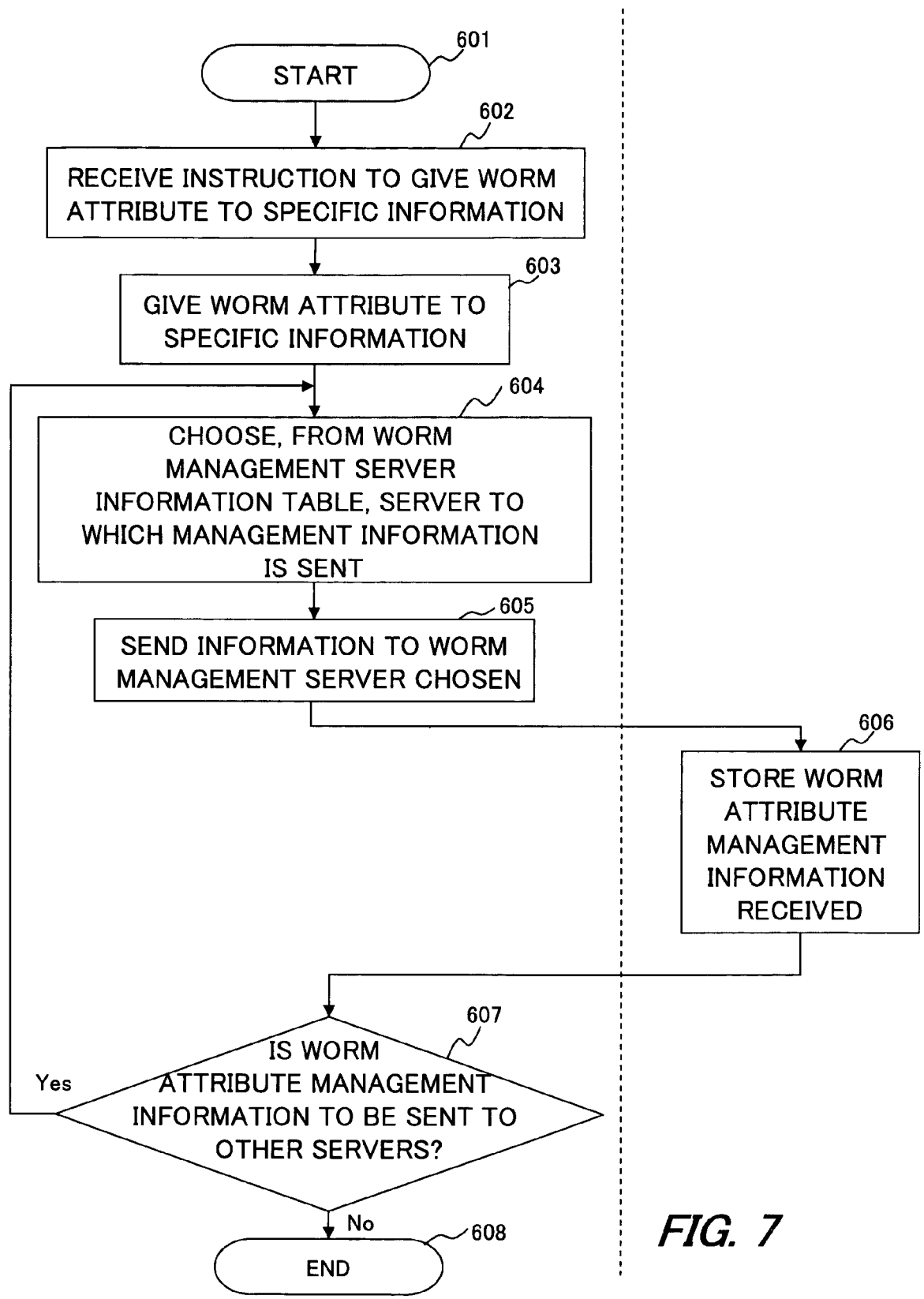
FIG. 7 is a flow chart of processing executed to render a WORM attribute in the computer system according to the embodiment of this invention.

FIG. 7 is a flow chart of processing executed to render a WORM attribute in the computer system according to the embodiment of this invention.

In FIG. 7, shown to the left of the broken line is processing executed by the storage system 4 whereas processing executed by the WORM management server 7 is shown to the right of the broken line.

The processing shown to the left side of the broken line in FIG. 7 is executed by the WORM management program 313 of the storage system 4. In FIG. 7, the WORM attribute changing program 311 operates as a subroutine of the WORM management program 313.

When processing of giving a WORM attribute is started (a step S601), the WORM management program 313 receives an instruction to give a WORM attribute to specific information (a step S602). This instruction is issued from the management host 5 or the host 2.

Next, the WORM attribute changing program 311 gives the WORM attribute to this specific information (a step S603). Specifically, the WORM attribute is given to the area where the specific information is stored. As a result, information on the given WORM attribute is stored in the WORM attribute information table 321 as shown in FIG. 9.

The WORM attribute changing program 311 then chooses, from the WORM management server information table 322, the WORM management server 7 to which WORM attribute management information is to be sent (a step S604).

The WORM attribute management information is then sent to the WORM management server 7 that has been chosen in the step S604 (a step S605). The information sent at this point includes one corresponding to the storage system identifier 511, the subject data area information 512, the WORM attribute rendering start time 513, and the WORM attribute rendering end time 514.

The WORM attribute information management program 403 of the WORM management server 7 receives the WORM attribute management information sent in the step S605 and stores the received information as the WORM attribute management information 501 in the WORM attribute management information table 405 (a step S606).

Next, the WORM management program 313 judges whether to send the WORM attribute management information to another WORM management server 7 or not (a step S607).

Whether to send WORM attribute management information to plural WORM management servers 7, 7, 7 . . . or not may be set in advance by the administrator. In this case, the WORM management program 313 refers to the setting to judge in the step S607. For instance, when IP addresses of plural WORM management servers 7, 7, 7 . . . are specified in FIG. 9, which will be described later, the WORM attribute management information may be judged to be sent to the plural WORM management servers 7, 7, 7 . . . .

Alternatively, the WORM management program 313 may ask the administrator in the step S607 about whether to send the WORM attribute management information to another WORM management server 7 or not. In this case, the WORM management program 313 consults the response from the administrator to make a judgment in the step S607.

When WORM attribute management information is sent to plural WORM management servers 7, 7, 7 . . . , a WORM attribute change permit can be obtained from each of the WORM management servers 7, 7, 7 . . . . This means that, while a failure is occurring in one of the WORM management servers 7, 7, 7 . . . , a WORM attribute change permit can be obtained from the rest of the WORM management servers 7, 7, 7 . . . . The data validity is guaranteed more securely if a WORM attribute is set such that it is removable only when a WORM attribute change permit is obtained from every one of plural WORM management servers 7, 7, 7 . . . to which the WORM attribute management information is sent.

When it is judged in the step S607 that the WORM attribute management information should be sent to another WORM management server 7, the procedure returns to the step S604.

On the other hand, when it is judged in the step S607 that the WORM attribute management information should not to be sent to another WORM management server 7, the processing is ended (a step S608).

Figure 8:
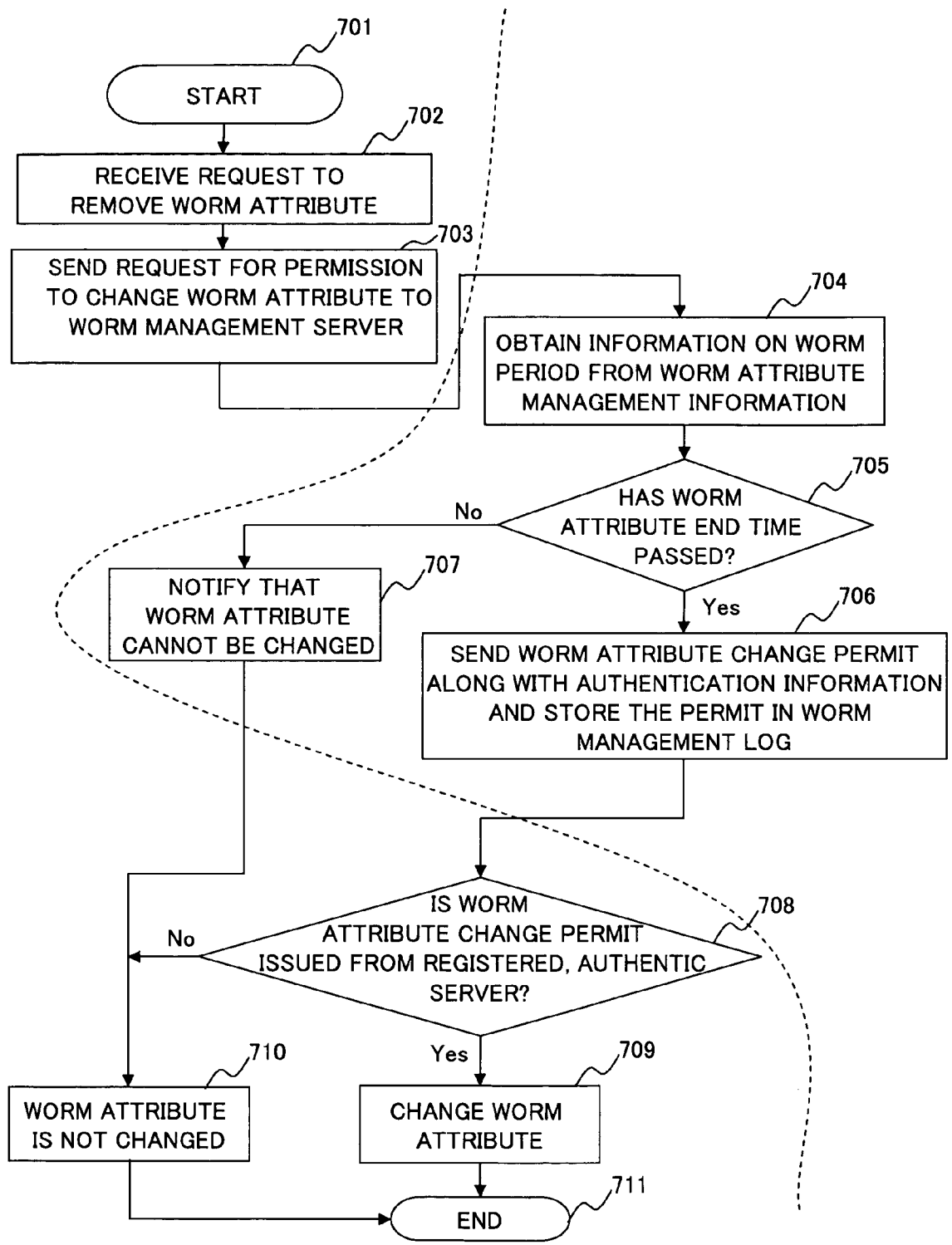
FIG. 8 is a flow chart of processing executed to remove a WORM attribute in the computer system according to the embodiment of this invention.

FIG. 8 is a flow chart of processing executed to remove a WORM attribute in the computer system according to the embodiment of this invention.

In FIG. 8, shown to the left of the broken line is processing executed by the storage system 4 whereas processing executed by the WORM management server 7 is shown to the right of the broken line.

The processing shown to the left side of the broken line in FIG. 8 is executed by the WORM management program 313 of the storage system 4. In FIG. 8, the WORM attribute changing program 311 and the WORM management server authentication program 312 operate as subroutines of the WORM management program 313.

When processing of removing a WORM attribute is started (a step S701), the WORM management program 313 receives an instruction to remove a WORM attribute to specific information (a step S702).

This request may be issued, for example, by the management host 5 when the management host 5 is about to give an instruction to remove a WORM attribute. In this case, the WORM management program 313 judges that removal of a WORM attribute is necessary when an instruction to remove the WORM attribute is received from the management host 5.

Another option is to issue this request from the host 2 when the host 2 updates data that is given a WORM attribute. In this case, the WORM management program 313 judges that removal of a WORM attribute is necessary when a data update request is received from the host 2.

Still another option is to issue the WORM attribute removal request from the storage system 4 when the storage system 4 judges that a WORM guarantee period has expired. In this case, the WORM management program 313 judges that removal of a WORM attribute is necessary when the storage system 4 judges that a WORM guarantee period has expired.

Next, the WORM management program 313 sends confirmation on the end of a WORM attribute to the WORM management server 7 (in other words, a request for permission to change the WORM attribute) (a step S703).

The WORM attribute information management program 403 of the WORM management server 7 receives the request for permission to change the WORM attribute which has been sent in the step S703, and consults the WORM attribute management information table 405 to obtain information about the WORM period of the area whose WORM attribute is requested to be removed (a step S704). Specifically, the WORM attribute end time 514 is obtained.

Then the time management program 402 compares the current time with the WORM attribute end time 514 to judge whether the current time is past the WORM attribute end time 514 (a step S705).

When the current time is not past the WORM attribute end time 514, the WORM attribute cannot be changed. The WORM attribute information management program 403 accordingly notifies the storage system 4 that the WORM attribute cannot be changed (a step S707), and the procedure proceeds to a step S710.

There is no need to add authentication information of the WORM management server 7 which will be described later to the notification of the fact that the WORM attribute cannot be changed. If a computer that is not the WORM management server 7 impersonates the WORM management server 7 and notifies that the WORM attribute cannot be changed, the notification prohibits data updating and maintains the validity of the data. Still, authentication information may be added to the notification of the fact that the WORM attribute cannot be changed in order to prevent such impersonation.

On the other hand, when the current time is past the WORM attribute end time 514, the WORM attribute can be changed. The WORM attribute information management program 403 accordingly issues a WORM attribute change permit. The WORM attribute change permit is sent to the storage system 4 and at the same time stored in the WORM management log 406 (a step S706). At this point, the authentication program 404 adds authentication information of the WORM management server 7 to the WORM attribute change permit.

The authentication information added is, for example, a data string encoded with the use of a private key. The whole WORM attribute change permit may be encoded with the use of a private key.

The WORM management server authentication program 312 of the storage system 4 receives the WORM attribute change permit and judges whether or not the WORM attribute change permit is issued from the authentic WORM management server 7 that is registered in the WORM management server information table 322 (a step S708).

Specifically, the authentication information added to the WORM attribute change permit is used to check the authenticity of the WORM management server 7. For instance, in the case where a data string encoded with the use of a private key is added as the authentication information, the data string is decoded with a public key. Successful decoding of the data string means that the WORM management server 7 is authentic.

When the WORM management server 7 is authenticated, it is judged that the WORM attribute change permit is issued from an authentic WORM management server 7. In this case, the WORM attribute can be changed and therefore the WORM attribute changing program 311 changes (removes) the WORM attribute (a step S709).

On the other hand, when the WORM management server 7 is not authenticated, it is judged that the WORM attribute change permit is not issued from an authentic WORM management server 7. In this case, the WORM attribute cannot be changed and the attempt to change the WORM attribute fails (the step S710). As a result, the WORM attribute is not removed.

This completes the processing of removing a WORM attribute (a step S711).

The validity of data is guaranteed more securely if a WORM attribute change permit is obtained from each of plural WORM management servers 7, 7, 7 . . . . In this case, WORM attribute management information is sent to plural WORM management servers 7, 7, 7 . . . in advance in the step S607 of FIG. 7. Then a WORM attribute change permit is obtained from each of the plural WORM management servers 7, 7, 7 . . . in the processing of FIG. 8.

For instance, after the step 708 is executed, the procedure returns to the step S703 to send confirmation on the end of a WORM attribute to other WORM management servers 7, 7, 7 . . . to which WORM attribute management information has been sent in advance. The steps S703 to 708 are repeated to obtain a WORM attribute change permit from every one of the WORM management servers 7, 7, 7 . . . to which WORM attribute management information has been sent in advance, and then the procedure proceeds to the step S709, where the WORM attribute is changed.

FIG. 9 is an explanatory diagram of a management screen according to the embodiment of this invention.

Employed in FIG. 9 is a graphical user interface (GUI) which uses a mouse or other pointing devices.

A management screen 801 is a screen displayed on an input/output device (omitted from the drawing) of the management host 5. The administrator of the computer system according to this embodiment manipulates the management screen 801 and enters information to determine setting about giving and removing a WORM attribute. The administrator can check the current setting by referring to the management screen 801.

The management screen 801 is composed of a WORM set area entering portion 802, a WORM period entering portion 803, an employed WORM management server entering portion 804, an input confirmation (OK) button 841, and an input cancellation (Cancel) button 842.

The WORM set area entering portion 802 is used to specify an area to which a WORM attribute is given. The WORM set area entering portion 802 is composed of a specifying method entering field 811, a logical volume number (LUN) entering field 812, a header address entering field 813, and a tail address entering field 814.

A method of specifying an area to which a WORM attribute is given is entered in the specifying method entering field 811. For instance, in the case where a WORM attribute is to be given to the entirety of a specific logical volume, "specify by LU" (omitted from the drawing) is entered in the specifying method entering field 811. In the case where a specific range of a specific logical volume is to have a WORM attribute, "specify by LU and LBA" is entered in the specifying method entering field 811. Here, LU stands for logical volume and LBA stands for logical block address. In the example of FIG. 9, "specify by LU and LBA" is entered.

The LUN of the logical volume to which the WORM attribute is to be given is entered in the LUN entering field 812. In the example of FIG. 9, "LU0" (namely, LUN equal "0") is entered.

The header logical block address of a range to which the WORM attribute is to be given is entered in the header address entering field 813. In the example of FIG. 9, an address "0x00000000" is entered.

The tail logical block address of the range to which the WORM attribute is to be given is entered in the tail address entering field 814. In the example of FIG. 9, an address "0x10000000" is entered.

As a result, in the example of FIG. 9, a WORM attribute is given to a range from the address "0x00000000" to "0x10000000" of a logical volume whose LUN is "0".

An area to which a WORM attribute is given may be specified by file name. In this case, a file name entering field (omitted from the drawing) is provided in the WORM set area entering portion 802.

The WORM period entering portion 803 is used to specify a WORM period. The WORM period entering portion 803 is composed of a period specifying and selecting field 821, a period entering field 822, an end time specifying and selecting field 823, and an end time entering field 824.

The administrator can choose from specifying the length of a WORM period and specifying the end time of a WORM period. In the case of specifying the length of a WORM period, the administrator checks the period specifying and selecting field 821 whereas the end time specifying and selecting field 823 is checked in the case of specifying the end time of a WORM period. In the example of FIG. 9, the period specifying and selecting field 821 is checked.

The length of a WORM period specified is entered in the period entering field 822. Input in this field is effective only when the period specifying and selecting field 821 is checked. In the example of FIG. 9, "five years" is entered.

The length of a WORM period specified is entered in the end time entering field 824. Input in this field is effective only when the end time specifying and selecting field 823 is checked. In the example of FIG. 9, "1 January, 2010" is entered.

As a result, in the example of FIG. 9, specifying the length of the WORM period is chosen and the specified length of the WORM period is "five years".

The employed WORM management server entering portion 804 is used to specify the WORM management server 7 to which WORM attribute management information is to be sent. The employed WORM management server entering portion 804 is composed of one or more IP address entering fields 831. Although FIG. 9 shows two IP address entering fields 831A and 831B, there may be more than two IP address entering fields 831.

The IP address of the WORM management server 7 to which WORM attribute management information is to be sent is entered in the IP address entering fields 831. The IP address is inputted in this field by choosing from IP addresses of WORM management servers 7, 7, 7 . . . that have been determined in advance by the manufacturer of the system. IP addresses of WORM management servers 7, 7, 7 . . . that have been determined in advance by the manufacturer of the system are stored in the WORM management server information table 322 of the storage system 4 as shown in FIG. 3. The administrator cannot add a new IP address to the table.

In the example of FIG. 9, "xxx. xxx. xxx. xxx" and "yyy. yyy. yyy. yyy" are entered as IP addresses of WORM management servers 7, 7, 7 . . . , and WORM attribute management information is sent to these IP addresses.

Usually, the IP address of the WORM management server 7 is not changed each time a WORM attribute is set. Therefore, the employed WORM management server entering portion 804 may be displayed on a screen separate from the one on which the WORM set area entering portion 802 and the WORM period entering portion 803 are displayed.

With a click on the OK button 841, the setting entered in FIG. 9 is stored in the storage system 4. Specifically, the step S602 of FIG. 7 is executed by clicking on the OK button 841 and, as a result, the setting entered in FIG. 9 is stored in the WORM attribute information table 321 (the step S603).

In the step S604, the IP addresses of the WORM management servers 7, 7, 7 . . . which have been entered in the employed WORM management server entering portion 804 are chosen. In the step S605, WORM attribute management information is sent from the storage system 4 to the IP addresses chosen. The identifier of the storage system 4 that sends the WORM attribute management information is sent along with the WORM attribute management information.

Each WORM management server 7 stores the received information as the WORM attribute management information 501 in the WORM attribute management information table 405. The storage system identifier 511 is the identifier of the storage system 4 that has sent the WORM attribute management information. The contents of the subject data area information 512 correspond to data entered in the WORM set area entering portion 802. The WORM attribute start time 513 indicates the time when the WORM attribute in question is set (for instance, when the OK button 841 is clicked on). The WORM attribute end time 514 indicates the time when the period entered in the period entering field 822 has passed from the WORM attribute start time 513.

With a click on the Cancel button 842, the setting entered in FIG. 9 is deleted to make the screen ready for input of new setting.

According to this invention described above, a WORM attribute given to data is managed by a third party other than the manager (owner) of the data. The manager of the data cannot update the data to which a WORM attribute is given unless permission is obtained from the third party. This enables the manager of the data to prove to another third party (an auditing organization, for example) that the data given a WORM attribute is not changed or, in other words, that the data is changed under authorization.

For instance, a company that owns the storage system 4 commits management of the WORM attribute of data to a third party that manages the WORM management server 7 (WORM management organization). The storage system 4 stores audit subject data of which preservation period is determined by law. The owner of the storage system 4 gives a WORM attribute to the data and sends information on the WORM attribute to the WORM management organization.

The WORM management organization stores the information sent in the WORM management server 7.

When updating the data stored in the storage system 4, the owner of the storage system 4 asks the WORM management organization for permission to remove the WORM attribute. The WORM management organization judges whether to permit removal of the WORM attribute of the data or not. Specifically, the WORM management organization judges whether the WORM period of the data has passed or not. When it is judged that the WORM period has passed, the WORM management organization issues a WORM attribute change permit. The WORM management organization sends the permit to the storage system 4 and at the same time stores the permit in the WORM management log 406 of the WORM management server 7.

The storage system 4 cannot change (remove) the WORM attribute unless the WORM attribute change permit is obtained.

When an auditing organization audits the data stored in the storage system, the owner of the storage system 4 requests the WORM management organization to output the WORM management log 406. The WORM management organization outputs the contents of the WORM management log 406 in response to the request and discloses the contents to the auditing organization. In this way, it is proved to the auditing organization that the data in the storage system 4 is updated under authorization (in other words, updated after expiration of the WORM period).

Unauthorized updating of data to which a WORM attribute is given is thus prevented. In addition, the validity of removal of the WORM attribute can be proven to a third party.

What is claimed is:

1. A storage system comprising:
   at least one disk drive that stores data to which an update prohibitive attribute with an expiration term is assigned; and
   a memory managing a correspondence relation between a management server, that is separate from the storage system, and an authentication information of the management server, the management server managing current time and information regarding the expiration term of the update prohibitive attribute;
   wherein the storage system is configured to request the management server to verify based on current time and the information regarding the expiration term of the update prohibitive attribute whether the expiration term of the update prohibitive attribute has passed or not, and to receive from the management server authentication information along with permission to change the update prohibitive attribute when the expiration term of the update prohibitive attribute has passed;
   wherein when the storage system receives the authentication information from the management server, based on the corresponding relation between the management server and the authentication information of the management server, the storage system checks the authenticity of the management server from which the permission is received, and
   wherein when the management server is authenticated, the storage system determines that the permission to change the update prohibitive attribute is sent from the authenticated management server and changes the update prohibitive attribute according to the permission.

2. The storage system according to claim 1
   wherein the storage system uses a predetermined decryption key to decrypt the authentication information, and
   wherein when the authentication information is decrypted successfully, the storage system determines that the management server is authentic.

3. The storage system according to claim 1 further comprising:
   a host computer coupled to the storage system; and,
   wherein when the storage system receives from the host computer a request to update the data to which the update prohibitive attribute is assigned, the storage system requests the management server to send the permission to change the update prohibitive attribute.

4. The storage system according to claim 1 further comprising:
   a management host computer, which assigns the update prohibitive attribute to the data, coupled to the storage system;
   wherein when the storage system receives a request to change the update prohibitive attribute of the data in the storage system from the management host computer, the storage system requests the management server to send the permission to change the update prohibitive attribute.

5. The storage system according to claim 1
   wherein when the storage system determines that the expiration term of the update prohibitive attribute of the data in the storage system has passed, the storage system requests the management server to send the permission to change the update prohibitive attribute.

6. The storage system according to claim 1 further comprising:
   a plurality of management servers coupled to the storage system;
   wherein when the storage system receives a request to assign the update prohibitive attribute to the data stored in the storage system, the storage system assigns the update prohibitive attribute to the data, selects the management server from the plurality of management servers, and sends information regarding the update prohibitive attribute to the management server selected.

7. A computer system comprising:
   a storage system storing data to which an update prohibitive attribute is assigned with a expiration term of the update prohibitive feature; and
   a management server managing current time and information regarding the expiration term of the update prohibitive attribute assigned to the data stored in the storage system,
   wherein the storage system requests the management server to send permission to change the update prohibitive attribute,
   wherein based on the current time and information regarding the expiration term of the update prohibitive attribute the management server determines whether the expiration term of the update prohibitive attribute has passed or not,
   wherein when the expiration term of the update prohibitive attribute has passed, the management server sends to the storage system authentication information along with the permission to change the update prohibitive attribute,
   wherein using the authentication information, the storage system checks the authenticity of the management server from which the permission to change the update prohibitive attribute is received, and
   wherein, when the management server is authenticated, the storage system determines that the permission to change the update prohibitive attribute is sent from the authentic management server and changes the update prohibitive attribute according to the permission.

8. A computer system of claim 7 wherein the storage system uses a predetermined decryption key to decrypt the authentication information, and wherein when the authentication information is decrypted successfully, the storage system determines that the management server is authentic.

9. A computer system of claim 7 further comprising: a host computer coupled to the storage system; and wherein when the storage system receives from the host computer a request to update data to which the update prohibitive feature is assigned, the storage system requests the management server to sent the permission to change the update prohibitive attribute.

10. A computer system of claim 7 further comprising: a management host computer, which assigns the update prohibitive attribute to the data, coupled to the storage system; and wherein when the storage system receives a request to change the update prohibitive attribute of the data in the storage system from the management host computer, the storage system requests the management server to sent the permission to change the update prohibitive attribute.

11. A computer system of claim 7 wherein when the storage system determines that the expiration term of the update prohibitive attribute of the data in the storage system has passed, the storage system requests the management server to send the permission to change the update prohibitive attribute.

12. A computer system of claim 7 wherein the computer system includes a plurality of management servers; and wherein when the storage system receives a request to assign the update prohibitive attribute to the data stored in the storage system, the storage system assigns the update prohibitive attribute to the data, selects the management server from the plurality of management, and sends the information regarding the update prohibitive attribute to the management server selected.

* * * * *